(12) United States Patent
Park et al.

(10) Patent No.: US 12,496,153 B2
(45) Date of Patent: Dec. 16, 2025

(54) ROUTING MECHANISMS FOR SURGICAL INSTRUMENTS, AND RELATED DEVICES, SYSTEMS, AND METHODS

(71) Applicant: INTUITIVE SURGICAL OPERATIONS, INC., Sunnyvale, CA (US)

(72) Inventors: William J. Park, San Jose, CA (US); Thomas G. Cooper, Menlo Park, CA (US)

(73) Assignee: INTUITIVE SURGICAL OPERATIONS, INC., Sunnyvale, CA (US)

( * ) Notice: Subject to any disclaimer, the term of this patent is extended or adjusted under 35 U.S.C. 154(b) by 1528 days.

(21) Appl. No.: 16/317,264

(22) PCT Filed: May 15, 2017

(86) PCT No.: PCT/US2017/032683
§ 371 (c)(1),
(2) Date: Jan. 11, 2019

(87) PCT Pub. No.: WO2018/013211
PCT Pub. Date: Jan. 18, 2018

(65) Prior Publication Data
US 2019/0314098 A1    Oct. 17, 2019

Related U.S. Application Data

(60) Provisional application No. 62/362,344, filed on Jul. 14, 2016, provisional application No. 62/362,357, filed on Jul. 14, 2016.

(51) Int. Cl.
*A61B 18/12* (2006.01)
*A61B 17/29* (2006.01)
(Continued)

(52) U.S. Cl.
CPC ............. *A61B 34/35* (2016.02); *A61B 17/29* (2013.01); *A61B 18/1445* (2013.01);
(Continued)

(58) Field of Classification Search
CPC . A61B 17/29; A61B 18/1445; A61B 18/1482; A61B 2017/2901;
(Continued)

(56) References Cited

U.S. PATENT DOCUMENTS 6,673,290 B1 *   1/2004   Whayne ................... A61N 1/06
                                                                    264/318
7,819,884 B2   10/2010   Lee et al.
(Continued)

FOREIGN PATENT DOCUMENTS

CN     103908242 A     7/2014
CN     104508930 A     4/2015
(Continued)

OTHER PUBLICATIONS

International Search Report and Written Opinion for Application No. PCT/US2017/032683, mailed on Oct. 27, 2017, 18 pages.
(Continued)

*Primary Examiner* — Daniel W Fowler
(74) *Attorney, Agent, or Firm* — Jones Robb, PLLC

(57) ABSTRACT

In accordance with an exemplary embodiment, a surgical instrument comprises a shaft and an actuation member extending through a bore of the shaft and operably coupled to an end effector. A sleeve is disposed around the actuation member and within the bore of the shaft. A flux conduit configured to transmit a surgical flux to the end effector is at least partially received within a negative feature of the sleeve. In accordance with another exemplary embodiment, a surgical instrument comprises a shaft, a wrist mechanism coupling an end effector to the shaft, and an actuation
(Continued)

member operably coupled to the end effector. A sleeve surrounds the actuation member and has a straight passage. A flux conduit operably coupled to the end effector is received within the straight passage. A portion of the flux conduit is slack in a region of the shaft through which the sleeve does not extend.

19 Claims, 10 Drawing Sheets

(51) Int. Cl.
    *A61B 18/14*     (2006.01)
    *A61B 34/35*     (2016.01)
    *A61B 18/00*     (2006.01)
    *A61B 34/30*     (2016.01)

(52) U.S. Cl.
    CPC ............... *A61B 2017/2901* (2013.01); *A61B 2018/00083* (2013.01); *A61B 2018/00136* (2013.01); *A61B 2018/00178* (2013.01); *A61B 18/1482* (2013.01); *A61B 2034/305* (2016.02)

(58) Field of Classification Search
    CPC ........... A61B 2018/00136; A61B 2018/00178; A61B 34/35
    See application file for complete search history.

(56) References Cited

U.S. PATENT DOCUMENTS

| | | | | |
|---|---|---|---|---|
| 8,075,476 B2* | 12/2011 | Vargas | ................. | A61B 1/0055 600/114 |
| 2003/0069590 A1* | 4/2003 | Rabiner | ........... | A61B 17/00234 606/128 |
| 2003/0069598 A1* | 4/2003 | Miser | ..................... | A61B 17/29 606/205 |
| 2003/0097128 A1* | 5/2003 | Hayzelden | ......... | A61B 18/1492 606/41 |
| 2009/0088772 A1 | 4/2009 | Blumenkranz | | |
| 2009/0306604 A1* | 12/2009 | Darmos | ............. | A61B 18/1477 606/41 |
| 2010/0042097 A1 | 2/2010 | Newton et al. | | |
| 2010/0087818 A1* | 4/2010 | Cunningham | ..... | A61B 18/1445 606/53 |
| 2011/0009863 A1* | 1/2011 | Marczyk | ............ | A61B 18/1445 606/51 |
| 2011/0106073 A1* | 5/2011 | Mueller | ............. | A61B 18/1445 606/41 |
| 2012/0010615 A1* | 1/2012 | Cummings | ........ | A61B 18/1445 606/51 |
| 2012/0157813 A1* | 6/2012 | Doerr | ................. | A61B 18/1492 600/374 |
| 2012/0215220 A1 | 8/2012 | Manzo et al. | | |
| 2013/0012928 A1 | 1/2013 | Cooper et al. | | |
| 2013/0150846 A1* | 6/2013 | Aue | ................... | A61B 18/1445 606/41 |
| 2013/0325031 A1 | 12/2013 | Schena et al. | | |
| 2013/0325033 A1 | 12/2013 | Schena et al. | | |
| 2014/0094787 A1* | 4/2014 | Reynolds | .......... | A61M 25/0138 606/41 |
| 2014/0128886 A1 | 5/2014 | Holop et al. | | |
| 2014/0296869 A1 | 10/2014 | Kernbaum et al. | | |
| 2016/0067450 A1 | 3/2016 | Kowshik | | |

FOREIGN PATENT DOCUMENTS

| | | |
|---|---|---|
| CN | 209642290 U | 11/2019 |
| WO | WO-2012112888 A2 | 8/2012 |
| WO | WO-2015061674 A1 | 4/2015 |
| WO | WO-2015127231 A1 | 8/2015 |
| WO | WO-2015153111 A1 | 10/2015 |

OTHER PUBLICATIONS

Vertut, Jean and Phillipe Coiffet, Robot Technology: Teleoperation and Robotics Evolution and Development, English translation, Prentice-Hall, Inc., Inglewood Cliffs, NJ, USA 1986, vol. 3A, 332 pages.

\* cited by examiner

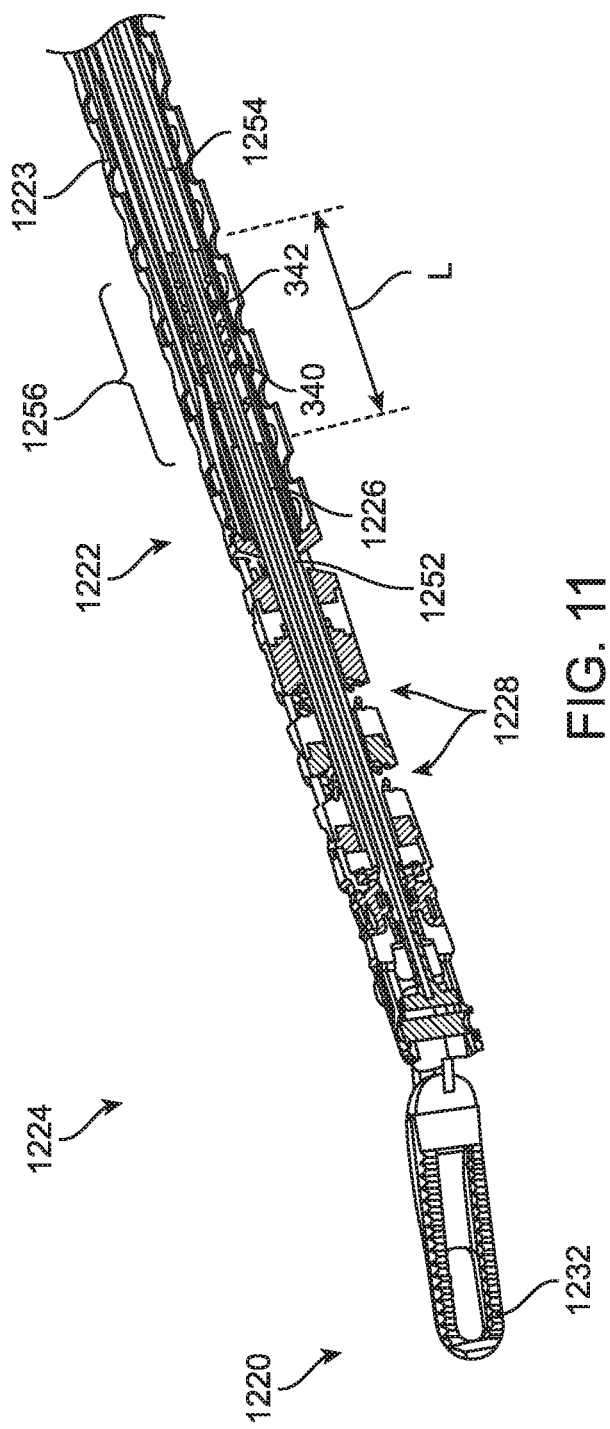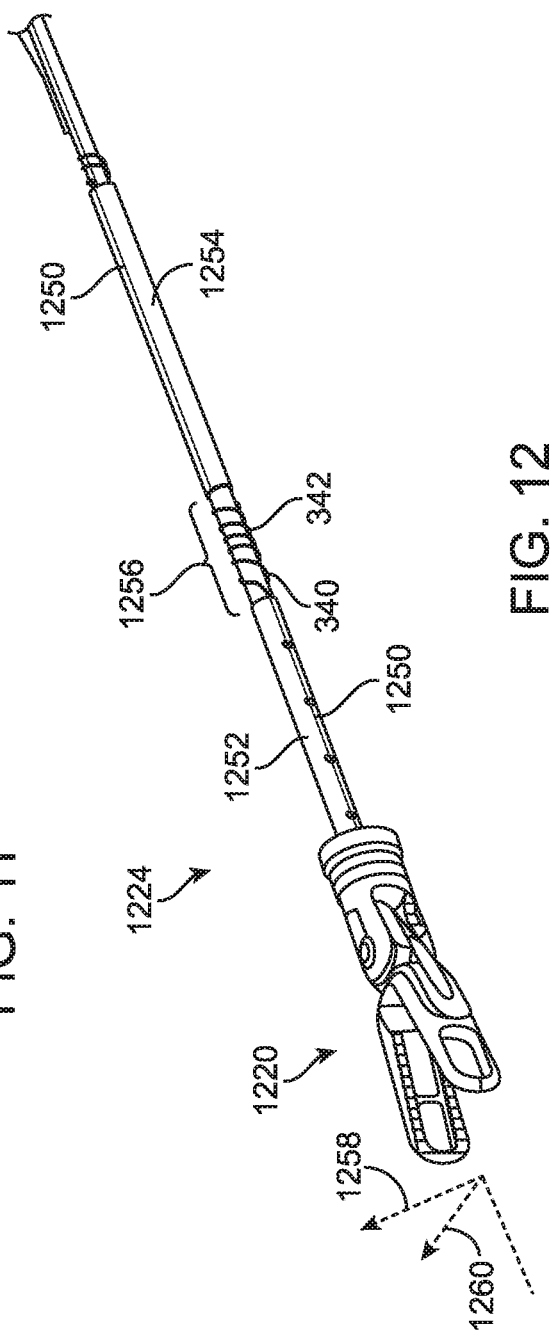

ROUTING MECHANISMS FOR SURGICAL INSTRUMENTS, AND RELATED DEVICES, SYSTEMS, AND METHODS

This application is a U.S. national stage application under 35 U.S.C. § 371(c) of International Application No. PCT/US2017/032683, filed on May 15, 2017, which claims priority to U.S. Provisional Application 62/363,344, filed Jul. 14, 2016, and to U.S. Provisional Application No. 62/362,357, also filed Jul. 14, 2016, each of the above applications being are incorporated by reference herein in its entirety.

TECHNICAL FIELD

Aspects of the present disclosure relate to surgical instruments, related components, related systems, and related methods.

INTRODUCTION

Benefits of minimally invasive surgery are well known, and they include less patient trauma, less blood loss, and faster recovery times when compared to traditional, open incision surgery. In addition, the use of teleoperated, computer-assisted surgical systems (e.g., robotic systems that provide telepresence), such as the da Vinci® Surgical System manufactured by Intuitive Surgical, Inc. of Sunnyvale, Calif., is known. Such teleoperated surgical systems may allow a surgeon to operate with intuitive control and increased precision when compared to manual minimally invasive surgeries.

Teleoperated surgical systems may include one or more surgical instruments or tools. Such tools can have a variety of configurations to perform various types of surgical procedures. For example, a surgical instrument may be an electrosurgical instrument configured to seal, fuse, blend, ablate, fulgurate, or otherwise treat tissue through the application of electrical flux energy.

Instruments for minimally invasive surgery may be relatively small in physical size to facilitate achieving the benefits associated with minimally invasive surgery discussed above. Accordingly, there may be limited space for various components of the instrument, such as actuation cables and/or rods used for remotely controlling movement of the instrument and flux conduits (e.g., electrical conductors in communication with an energy source of the surgical system and configured to deliver electrical current to an end effector of an electrosurgical instrument). Other flux conduits may include tubes for transporting gasses or liquids, etc. It is desirable to provide surgical instruments and components thereof that facilitate efficient routing and housing of the various components, including flux conduits.

Further, in instruments comprising one or more joints (e.g., toward a distal end portion of the instrument), additional space issues arise due to the need to route multiple cables through the instrument to provide actuation of the joints and/or end effector. There exists a need to provide small diameter surgical instruments while providing multiple members for actuation, flux delivery, and other instrument functions.

SUMMARY

Exemplary embodiments of the present disclosure may solve one or more of the above-mentioned problems and/or may demonstrate one or more of the above-mentioned desirable features. Other features and/or advantages may become apparent from the description that follows.

In accordance with at least one exemplary embodiment, a surgical instrument comprises a shaft having a proximal end, a distal end, and a bore extending from the proximal end to the distal end. The surgical instrument further comprises an end effector coupled to the distal end of the shaft, and an actuation member extending through the bore of the shaft and operably coupled to the end effector. A sleeve is disposed around the actuation member and within the bore of the shaft. The sleeve comprises a negative feature in a wall thickness of the sleeve, the negative feature extending along at least a portion of a length of the sleeve. A flux conduit configured to transmit a surgical flux to the end effector extends from the proximal end of the shaft to the end effector, the flux conduit being at least partially received within the negative feature of the sleeve.

In accordance with at least one exemplary embodiment, a method of forming a surgical instrument comprises routing an actuation member through a central bore of an instrument shaft and operably coupling the actuation member to an end effector at a distal end. The method further comprises positioning a sleeve within the bore and at least partially surrounding the actuation member and operably coupling a flux conduit to the end effector so as to enable the flux conduit to transmit a surgical flux to the end effector. The method further comprises routing the flux conduit through the bore of the instrument shaft to the end effector by disposing at least part of a length of the flux conduit at least partially within a negative feature provided in a wall thickness of the sleeve.

In accordance with at least one exemplary embodiment, a surgical instrument may comprise a shaft having a proximal end, a distal end, and a bore extending from the proximal end to the distal end. The surgical instrument may further comprise an end effector and a wrist mechanism coupling the end effector to the distal end of the shaft, the wrist mechanism being configured to articulate about a neutral position relative to the shaft. Further, the surgical instrument can comprise an actuation member extending through the bore of the shaft and the wrist mechanism, the actuation member being operably coupled to the end effector. A sleeve may surround the actuation member at least within the wrist mechanism, the sleeve having a straight passage radially offset from the actuation member and extending along the sleeve at least within the wrist mechanism. A flux conduit may extend through the bore of the shaft from the proximal end to the distal end, the flux conduit being operably coupled to the end effector, the flux conduit being received within the straight passage of the sleeve, wherein a portion of the flux conduit is slack in a region of the shaft through which the sleeve does not extend.

In accordance with at least one exemplary embodiment, a method of forming a surgical instrument may comprise routing an actuation member through a central bore of an instrument shaft and operably coupling the actuation member to an end effector at a distal end, positioning a sleeve within the bore and at least partially surrounding the actuation member, and operably coupling a flux conduit to the end effector so as to enable the flux conduit to transmit a surgical flux to the end effector. The method may further comprise routing the flux conduit through the bore of the instrument shaft to the end effector, wherein the routing comprises disposing at least part of a length of the flux conduit at least partially within a negative feature provided in a wall thickness of the sleeve, and forming a slack portion in the flux conduit at least when the wrist mechanism is in the neutral position, the slack portion being configured to move in and out of the negative feature in response to articulation of the wrist mechanism.

Additional objects, features, and/or advantages will be set forth in part in the description which follows, and in part will be obvious from the description, or may be learned by practice of the present disclosure and/or claims. At least some of these objects and advantages may be realized and attained by the elements and combinations particularly pointed out in the appended claims.

It is to be understood that both the foregoing general description and the following detailed description are exemplary and explanatory only and are not restrictive of the claims; rather the claims should be entitled to their full breadth of scope, including equivalents.

BRIEF DESCRIPTION OF THE DRAWINGS

The present disclosure can be understood from the following detailed description, either alone or together with the accompanying drawings. The drawings are included to provide a further understanding of the present disclosure, and are incorporated in and constitute a part of this specification. The drawings illustrate one or more exemplary embodiments of the present teachings and together with the description serve to explain certain principles and operation. In the drawings.

FIG. 11 is a cross-sectional view of distal end portion of a surgical instrument, including the wrist and end effector according to another exemplary embodiment;

FIG. 12 is a perspective view of an interior of the instrument of FIG. 11;

DETAILED DESCRIPTION

Figure 1A:
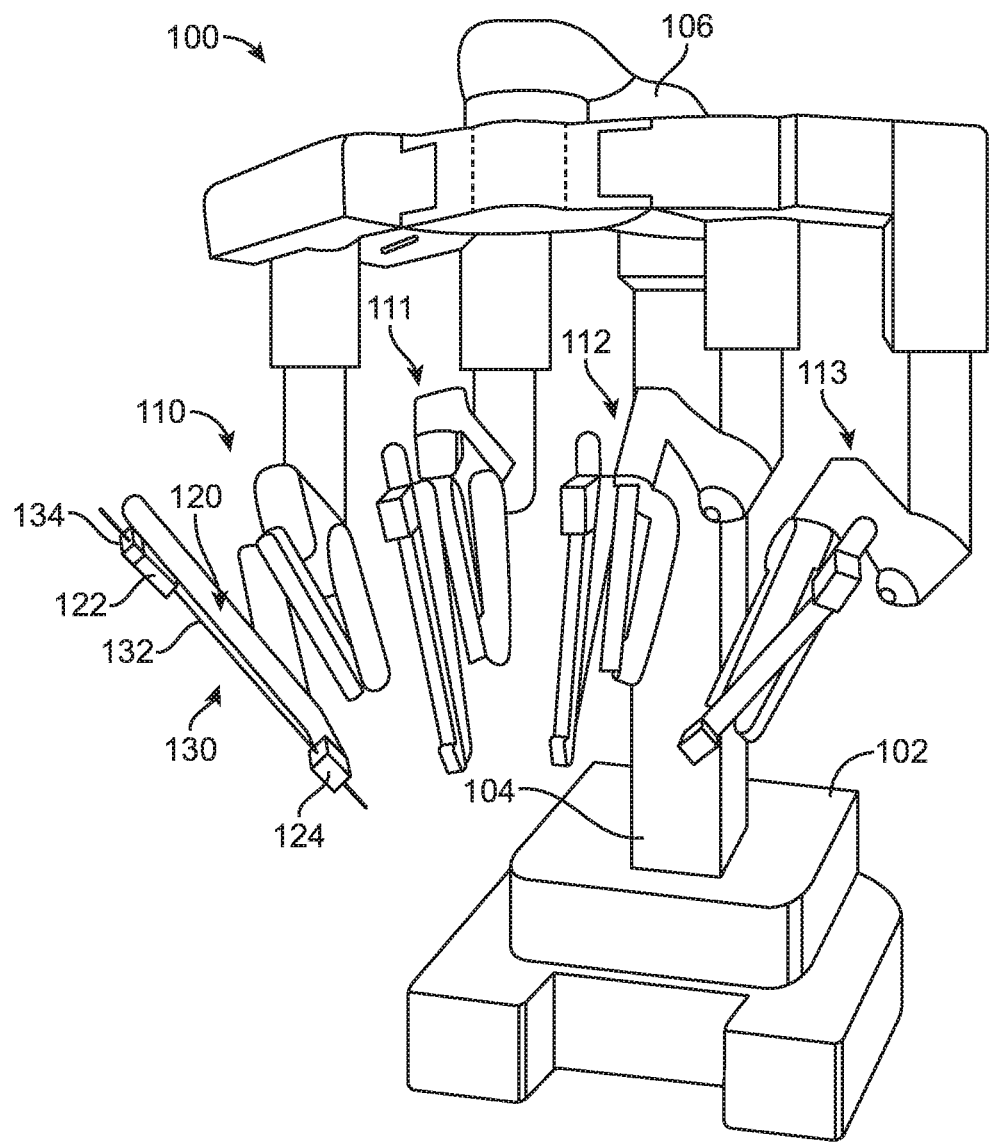
FIG. 1A is a front view of an exemplary embodiment of a patient side cart of a teleoperated surgical system.

The present disclosure contemplates various exemplary embodiments of surgical instruments configured to house multiple components within a shaft of the instrument while maintaining a relatively small diameter of the shaft. For example, surgical instruments of the disclosure may be configured to house one or more actuation members, such as one or more cables and/or rods, one or more electrical conductors, and a sleeve to support and orient the one or more actuation members within a bore of the shaft, while maintaining a relatively small outside diameter of the shaft.

In order to maintain a relatively small diameter of the instrument shaft while being configured to house the various components described above, the present disclosure contemplates various exemplary embodiments of surgical instruments with one or more flux conduits routed through a negative feature (e.g., recess) of a sleeve disposed in a bore of a shaft of the surgical instrument and surrounding an actuation member extending along the shaft. In an exemplary embodiment, the flux conduits may be electrical conductors configured to deliver electrosurgical energy for the instrument. The one or more flux conduits may be positioned in a negative feature formed in the sleeve. The negative feature may comprise a relief, a recess, a groove, etc. formed in the sleeve and configured to receive the flux conduit. The negative feature may follow a straight path along a length of the sleeve, a helical path along the length of the sleeve, or combinations thereof; other geometries are also contemplated. In some exemplary embodiments, the negative feature may extend fully through a wall thickness of the sleeve from an inner surface of the sleeve to an outer surface of the sleeve. In some exemplary embodiments, the negative feature may extend partially into a wall thickness of the sleeve from the inner surface of the sleeve or from the outer surface of the sleeve. In some exemplary embodiments, the negative feature may extend through a central portion of the wall thickness of the sleeve intermediate the inner surface and the outer surface. In some exemplary embodiments, the sleeve may comprise multiple, individual sleeve segments, and the sleeve segments may be longitudinally spaced apart along a length of the shaft, e.g., by a spacer. In some exemplary embodiments, the sleeve may comprise reliefs (e.g., cuts, slits, etc.) formed partially or completely through the wall thickness of the sleeve to facilitate bending of the sleeve in regions proximate joint structures (e.g., wrists) of the shaft.

In some exemplary embodiments, the electrical conductors may be surrounded by an electrically insulating material, and the electrical conductors and insulating material may be disposed within the negative feature of the sleeve. The electrical conductor may be separated from the sleeve by the electrically insulating material. In some exemplary embodiments, the sleeve may comprise electrically insulating material, and the electrical conductor may be disposed directly in contact with a surface of the sleeve within the negative feature. In yet other exemplary embodiments, the electrical conductors may be surrounded by an electrically insulating material, and the electrical conductors and insulating material may be helically wrapped around the actuation member to form the sleeve. In other words, the sleeve may be formed entirely of the electrically insulating material surrounding the electrical conductors.

Exemplary embodiments of the present disclosure provide surgical instruments maintaining desired functionality while exhibiting desirably small dimensions, such as a diameter of the instrument shaft. In addition, exemplary embodiments of the disclosure may provide such advantages while being configured for ease of manufacturing, assembly, overall low cost, etc.

As discussed above, in accordance with various exemplary embodiments, surgical instruments of the present disclosure are configured for use in teleoperated, computer-assisted surgical systems (sometimes referred to as robotic surgical systems). Referring now to FIG. 1A, an exemplary embodiment of a patient side cart 100 of a teleoperated, computer-assisted surgical system, to which surgical instruments are configured to be mounted for use, is shown. Such a surgical system may further include a surgeon console (not shown) for receiving input from a user to control instruments of patient side cart 100, as well as an auxiliary control/vision cart (not shown), as described in, for example, U.S. Pub. No. US 2013/0325033, entitled "Multi-Port Surgical Robotic System Architecture" and published on Dec. 5, 2013, and U.S. Pub. No. US 2013/0325031, entitled "Redundant Axis and Degree of Freedom for Hardware Constrained Remote Center Robotic Manipulator" and published on Dec. 5, 2013, each of which is hereby incorporated by reference in its entirety. Non-limiting, exemplary embodiments of teleoperated surgical systems with which the principles of the present disclosure may be utilized include the da Vinci® Si (model no. IS3000) da Vinci® Si Surgical System, Single Site da Vinci® Surgical System, or a da Vinci® Xi Surgical System, available from Intuitive Surgical, Inc. of Sunnyvale, California. However, persons having ordinary skill in the art will appreciate that the present disclosure can be applied to a variety of surgical systems including automated or manual (hand-held) laparoscopic surgical systems.

As shown in the exemplary embodiment of FIG. 1A, patient side cart 100 includes a base 102, a main column 104, and a main boom 106 connected to main column 104. Patient side cart 100 also includes a plurality of arms 110, 111, 112, 113, which are each connected to main boom 106. Arms 110, 111, 112, 113 each include an instrument mount portion 120 to which an instrument 130 may be mounted, which is illustrated as being attached to arm 110. Portions of arms 110, 111, 112, 113 may be manipulated during a surgical procedure according to commands provided by a user at the surgeon console. In an exemplary embodiment, signal(s) or input(s) transmitted from a surgeon console are transmitted to the control/vision cart, which may interpret the input(s) and generate command(s) or output(s) to be transmitted to the patient side cart 100 to cause manipulation of an instrument 130 (only one such instrument being mounted in FIG. 1A) and/or portions of arm 110 to which the instrument 10 is coupled at the patient side cart 100.

Instrument mount portion 120 comprises an actuation interface assembly 122 and a cannula mount 124, with a force transmission mechanism 134 of the instrument 130 connecting with the actuation interface assembly 122, according to an exemplary embodiment. Cannula mount 124 is configured to hold a cannula 136 through which a shaft 132 of instrument 130 may extend to a surgery site during a surgical procedure. Actuation interface assembly 122 contains a variety of drive and other mechanisms that are controlled to respond to input commands at the surgeon console and transmit forces to the force transmission mechanism 134 to actuate the instrument 130, as those skilled in the art are familiar with.

Although the exemplary embodiment of FIG. 1A shows an instrument 10 attached to only arm 110 for ease of viewing, an instrument may be attached to any and each of arms 110, 111, 112, 113. An instrument 10 may be a surgical instrument with an end effector as discussed herein. A surgical instrument with an end effector may be attached to and used with any of arms 110, 111, 112, 113. However, the embodiments described herein are not limited to the exemplary embodiment of FIG. 1A and various other teleoperated, computer-assisted surgical system configurations may be used with the exemplary embodiments described herein.

Figure 1B:
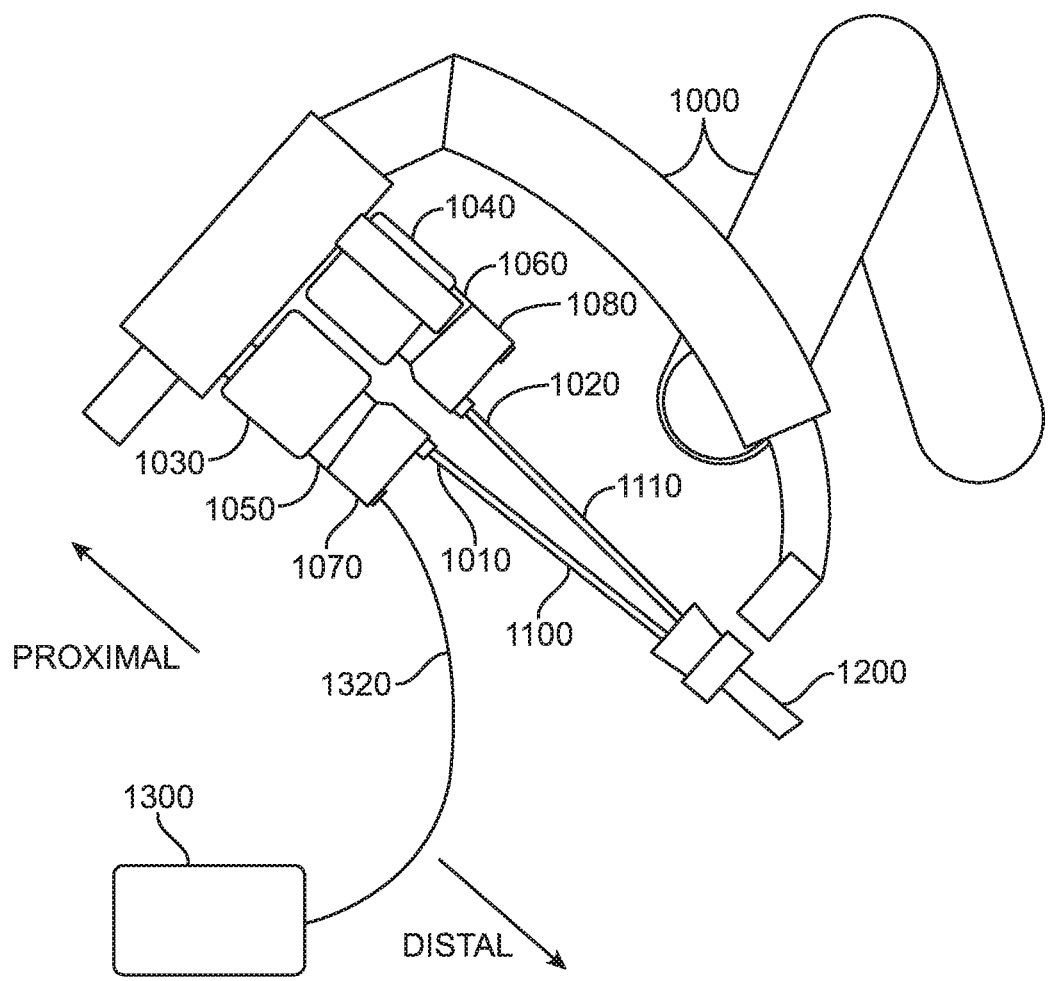
FIG. 1B is a partial schematic view of an exemplary embodiment of a manipulator arm of a patient side cart with two electrosurgical instruments in an installed position, one of which is shown in electrical communication with a flux generator.

Other configurations of surgical systems, such as surgical systems configured for single-port surgery, are also contemplated. For example, with reference now to FIG. 1B, a portion of an exemplary embodiment of a manipulator arm 1000 of a patient side cart with two surgical instruments 1010, 1020 in an installed position is shown. A teleoperated robotic surgical system, including a patient side cart comprising manipulator arm 1000, may be configured according to the exemplary embodiments described in U.S. patent application Ser. No. 14/070,184, filed Nov. 1, 2013 (for "FLUX DISAMBIGUATION FOR TELEOPERATED SURGICAL SYSTEMS"), which is incorporated by reference herein. The schematic illustration of FIG. 1B depicts only two surgical instruments for simplicity, but more than two surgical instruments may be received in an installed position at a patient side cart as those having ordinary skill in the art are familiar with. Each surgical instrument 1010, 1020 includes an instrument shaft 1100, 1110 that at a distal end has a moveable end effector (discussed below in regard to FIG. 2) or a camera or other sensing device, and may or may not include a wrist mechanism (not shown) to control the movement of the distal end via articulation about a neutral position relative to the shaft.

In the exemplary embodiment of FIG. 1B, the distal end portions of the surgical instruments 1010, 1020 are received through a single port structure 1200 to be introduced into the patient. Other configurations of patient side carts that can be used in conjunction with the present disclosure can use several individual manipulator arms. In addition, individual manipulator arms may include a single instrument or a plurality of instruments. Further, an instrument may be a surgical instrument with an end effector or may be a camera instrument or other sensing instrument utilized during a surgical procedure to provide information, (e.g., visualization, electrophysiological activity, pressure, fluid flow, and/or other sensed data) of a remote surgical site.

Force transmission mechanisms 1070, 1080 are disposed at a proximal end of each shaft 1100, 1110 and connect through a sterile adaptor 1050, 1060 with actuation interface assemblies 1030, 1040. Actuation interface assemblies 1030, 1040 contain a variety of internal mechanisms (not shown) that are controlled by a controller (e.g., at a control cart of a surgical system) to respond to input commands at a surgeon side console of a surgical system to transmit forces to the force transmission mechanisms 1070, 1080 to actuate instruments 1010, 1020. The diameter or diameters of an instrument shaft, wrist mechanism, and end effector are generally selected according to the size of the cannula with which the instrument will be used and depending on the surgical procedures being performed. In various exemplary embodiments, a shaft and/or wrist mechanism has a diameter of about 4 mm, 5 mm, or 8 mm in diameter, for example, to match the sizes of some existing cannula systems. According to an exemplary embodiment, one or more of surgical instruments 1010, 1020 may be in communication with a flux source 1300 via a flux transmission conduit 1320.

For example, if a surgical instrument 1010 is an electrosurgical instrument, flux transmission conduit 1320 is an electrical energy transmission cable and flux source 1300 is an electrical energy generator.

Figure 2:
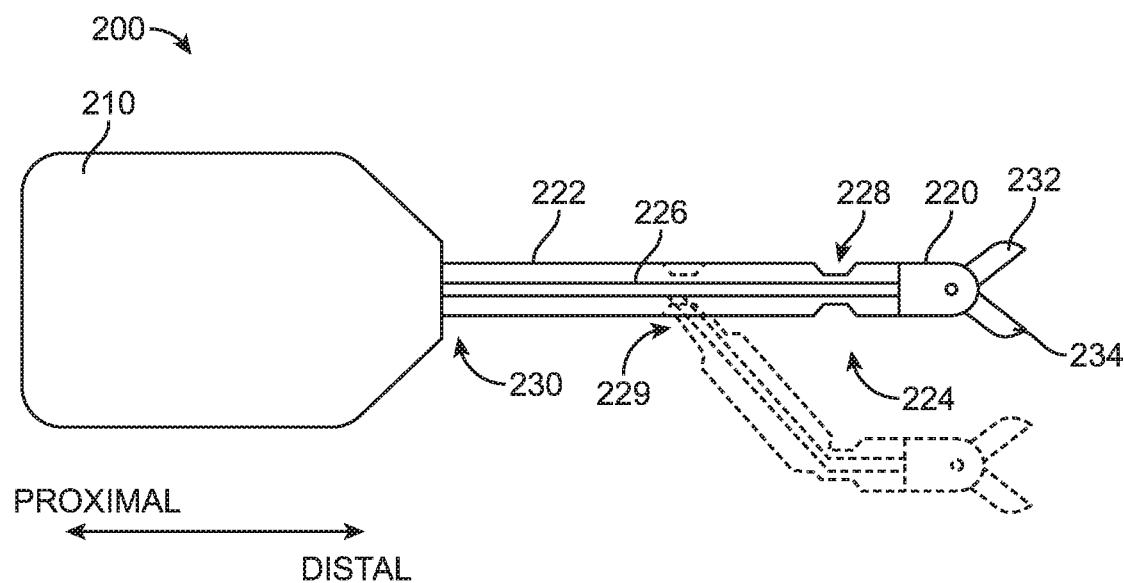
FIG. 2 is a perspective view of an exemplary embodiment of a surgical instrument including an end effector.

FIG. 2 is a schematic view of an exemplary embodiment of a surgical instrument 200. The surgical instrument 200 may include a force transmission mechanism 210, an end effector 220 at a distal end 224 of the surgical instrument, and a shaft 222 connecting the force transmission mechanism 210 and the end effector 220. The surgical instrument 200 may include one or more members to translate force between the force transmission mechanism 210 and the end effector 220. For instance, one or more member(s) 226 may connect the force transmission mechanism 210 to the end effector 220 to provide actuation forces to the end effector 220 by extending through an interior (e.g., a bore) of the shaft 222. By utilizing member(s) 226, the force transmission mechanism 210 may actuate the end effector 220 to, for example, control a moveable component, such as one or more jaws, of the end effector 220.

The surgical instrument 200 may also include one or more articulating joints to help orient the end effector. For example, a wrist 228 may be disposed at the distal end 224 of the shaft 222 and couple the end effector 220 to the shaft 222. Accordingly, the actuation member 226 may be configured to deflect (e.g., by elastic deformation) during articulation of the wrist 228 about a neutral position relative to the shaft. For example, in an exemplary embodiment, the actuation member 226 may comprise a metal material, a polymer material, etc. As a non-limiting example, the actuation member 226 may comprise a tungsten cable, and may be solid, stranded, braided, etc. The actuation member 226 may be configured as a "push/pull" member. In other words, the actuation member 226 may be configured to transfer tensile and compressive forces placed on the actuation member 226 by the force transmission mechanism 210 to the end effector 220 to operate (e.g., open or close jaws of) the end effector 220. For example, the actuation member 226 may translate alternately in the distal and proximal directions to operate the end effector 220 (e.g., open and close jaws 232, 234 of the end effector 220).

Optionally, the surgical instrument can include an additional wrist mechanism 229 as shown in dotted lines in FIG. 2. The wrist 229 provides an additional degree of freedom of movement to the end effector 220. For example, certain coordinated movements of the wrist 228 and wrist 229 enable generally lateral translation of the end effector 220, as shown in dashed lines in FIG. 2. Each wrist 228, 229, or additional wrists or other joint structures (not shown) may be associated with a respective actuation member extending through the shaft 222, and each of the joint structures (e.g., wrists 228, 229) may be configured to provide a degree of freedom, such as pitch or yaw, to the end effector 220.

In exemplary embodiments, one or more flux conduits may extend through the instrument shaft 222, e.g., from the force transmission mechanism 210 to the end effector 220. For example, in an exemplary embodiment, the end effector 220 comprises a bipolar electrocautery tool, and two electrical conductors (not shown) extend from the force transmission mechanism 210 and connect to respective jaws 232, 234 of the end effector 220. Electrical energy may be conducted through the electrical conductors and delivered to the end effector 220 to carry out electrosurgical operations such as, for example, cauterizing, fulgurating, sealing, fusing, blending, ablating, etc.

Figure 3:
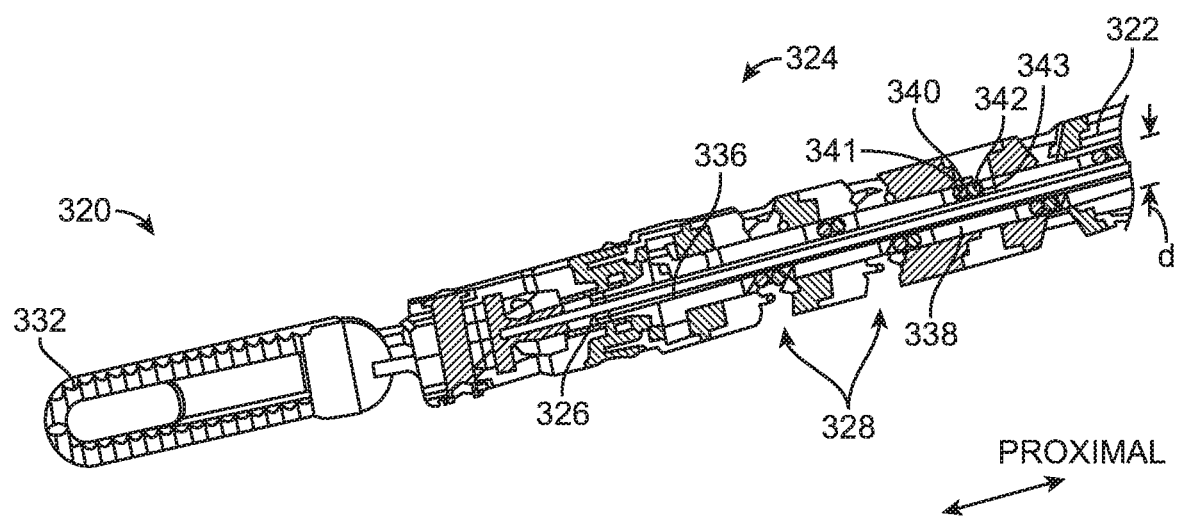
FIG. 3 is a cross-sectional view of an instrument and associated end effector according to an exemplary embodiment.

Referring now to FIG. 3, a distal portion 324 of an instrument shaft 322 is shown in cross-section. One jaw 332 of an end effector 320 including two jaws (332 and 334 in FIG. 4) is shown in FIG. 3, the other jaw being omitted due to the cross section. Wrist joints 328 (also called "wrist 328") configured couple the end effector 320 to the shaft 322 and enable articulation of the end effector 320 in one or more degrees of freedom, (e.g., pitch and/or yaw). An actuation member 326 extends centrally through a bore 336 of the shaft 322 and is operably connected with the end effector 320 to operate the end effector 320, (e.g., open and close the jaws 332, 334 (not shown) in FIG. 3). In the exemplary embodiment of FIG. 3, the actuation member 326 is a push/pull actuator; however, the disclosure is not so limited, and embodiments with, for example, one or more pull/pull actuators configured to operate the end effector 320, or other actuation member configurations, are within the scope of the disclosure. In the exemplary embodiment of FIG. 3, the actuation member 326 may be a metal cable, e.g., a tungsten cable, with a polymer coating, such as an ethylene tetrafluoroethylene (ETFE) coating. Those having ordinary skill in the art would appreciate various other push/pull, flexible actuation member configurations may be used other than metal cables.

A sleeve 338 is disposed in the bore 336 of the shaft 322 between the inner surface of the shaft 322 and the actuation member 326. The sleeve 338 may assist to position the actuation member 326 centrally within the bore 336. The sleeve 338 may also protect the actuation member 326 from damage due to contact with components of the instrument shaft 322, such as components of the wrist joints 328, which may have sharp or rough edges, etc. Further, in embodiments in which the actuation member 326 is a push/pull element, the sleeve 338 is configured to constrain buckling of the actuation member 326 under compressive forces applied during operation, e.g., by the force transmission mechanism (e.g., force transmission mechanism 210 (FIG. 2)) translates the actuation member 326 in the distal direction. Finally, the sleeve 338 may provide a low-friction surface against which the actuation member 326 bears as it moves proximally and distally to actuate the end effector 320.

Conductive members 340, 342 (also called "conductors 340, 342" or "conductive assemblies 340, 342") conduct electrical current from a source of electrical energy associated with a patient side cart (e.g., patient side cart 100 (FIG. 1)) to the jaws 332, 334 of the end effector 320, for performing electrosurgical operations such as cauterizing, sealing, ablating, blending, fusing, fulgurating, etc. The conductive members 340 and 342 may comprise a core of conductive material 341 (e.g., copper, aluminum, or other electrically conductive material used to flow electrical current) surrounded by an insulating material 343, as those of ordinary skill in the art are familiar with. In the embodiment of FIG. 3, the core conductive material 341 of the conductive members 340, 342 may be held at different electric potentials to provide a voltage differential to generate a current flow between the jaws 332, 334 as desired for performing electrosurgical operations, for example, using a bipolar electrical energy mode. In some exemplary embodiments contemplated by the present disclosure, only one of the conductive members 340 and 342 shown in FIG. 3 may be included, and another portion of the surgical instrument comprising a conductive material, such as the instrument shaft 322 or the actuation member 326, for example, may be held at a different electric potential to generate the desired current flow.

Figure 10:
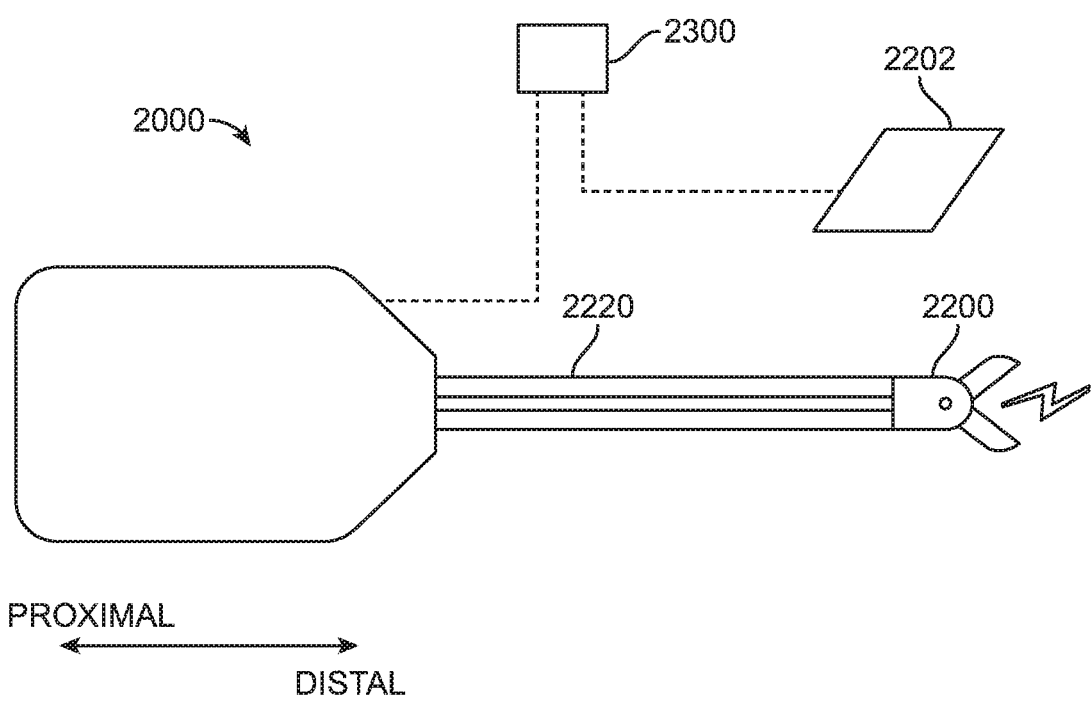
FIG. 10 is a schematic diagram of a monopolar electrosurgical instrument according to an exemplary embodiment.

In yet other exemplary embodiments, the surgical instrument may use a monopolar electrical energy mode, with one end effector component receiving electrical energy from one electrically conductive member, and with an electrical return being provided by an electrical ground. This electrical ground provides a reference electric potential that serves as "ground" for the instrument. In various embodiments, this electrical ground is associated with an electric potential of the human body, a system ground of an electrical energy generator 2300, or true earth ground. A monopolar instrument can be or include a single end effector member instead of jaws. FIG. 10 shows an exemplary embodiment of a monopolar electrosurgical instrument 2000. The instrument 2000 includes a monopolar energy mode end effector 2200. An electrical energy generator 2300 associated with a patient side cart (e.g., patient side cart 100 shown in FIG. 1A) is operably coupled with the end effector 2200 and with one or more components configured to electrically ground a body of a patient to the reference electric potential. For example, the electrical energy generator 2300 may be connected to a patient return pad 2202 in conductive contact with a patient. In some exemplary embodiments, a shaft 2220 of the instrument 2000 may extend through a cannula (not shown) comprising a conductive material operably connected with the electrical energy generator 2300. The electrical energy generator 2300 holds the patient return pad 2202 and/or conductive portion of the cannula at a ground potential (e.g., a "zero" voltage or other reference electric potential) while the end effector 2200 is brought to a different (e.g., higher) electric potential to generate a current flow through the end effector 2200 to perform an electrosurgical operation.

The sleeve 338 may be formed of a material chosen for frictional characteristics, compressive strength, temperature stability, resistance to sterilizing processes (e.g. autoclaving, ethylene oxide sterilization, gamma sterilization, e-beam sterilization, etc.), electrical isolation (e.g., dielectric strength), ease and cost of manufacturing, raw material cost, and/or other factors. As a non-limiting example, the sleeve 338 comprises ETFE and is formed first by extrusion (e.g., into a tubular form), with the resulting structure being subjected to subtractive processes, such as machining or cutting, to form the reliefs. As another non-limiting example, the sleeve 338 comprises PTFE (polytetrafluoroethylene). The PTFE material is extruded as a paste with an appropriate cross section, such as with the cross section shown in FIG. 15. Then, the material is sintered, cut to length, and heated and twisted to provide appropriate amounts of twist in different sections of the sleeve 338. Mandrels may be placed in lumens and recesses (such as recess 1551) during the heating and twisting to help retain the shape of these internal channels. Holes for cleaning and flexibility in the sleeve 338 may be formed by a process such as drilling before or after the heating and twisting. A sleeve 338 made of PTFE may be autoclaved for sterilization. As a specific example, the sleeve 338 comprises PTFE and has the cross-section shown in FIG. 15, with variable amounts of twist along its length; a 360 degree twist is made in the wrist area, and no twist (0 degree of twist) is made in other areas such as joints where conductors slide along the straight portions of recesses (such as recess 1551).

As another non-limiting example, the sleeve 338 comprises a thermoplastic such as polyethylene or polyether block amide (versions of polyether block amide being known under the tradenames VESTAMID E and PEBAX). This type of sleeve 338 may be manufactured by being twisted while being extruded, twisted shortly after being extruded (when the material is still heated and malleable) in a secondary operation, or reheated and twisted in a secondary operation. As a specific example, the sleeve 338 comprises polyethylene material having the cross-section shown in FIG. 15, and is extruded with linear recesses 1550, 1551. After extrusion, the sleeve 338 is twisted in a secondary operation; a 360 degree twist is made in the wrist area, and no twist (0 degree of twist) is made in other areas such as joints where conductors slide along the straight portions of recesses 1551.

Other suitable exemplary materials include other polymers, metal alloys, composite materials, etc. Other suitable exemplary forming processes include molding (e.g., injection molding), machining, additive manufacturing processes, etc. For example, in some embodiments, the sleeve 338 may be formed by injection molding portions of the sleeve 338 and assembling (e.g., bonding with heat, solvent, adhesive, etc.) the portions together. Injection molding the sleeve 338 in separate segments and subsequently connecting or attaching the separate segments may facilitate manufacture of the sleeve 338, such as by injection molding, particularly in embodiments where the sleeve 338 includes a helical recess, as shown and discussed in connection with FIGS. 4 through 7 below.

Figure 4:
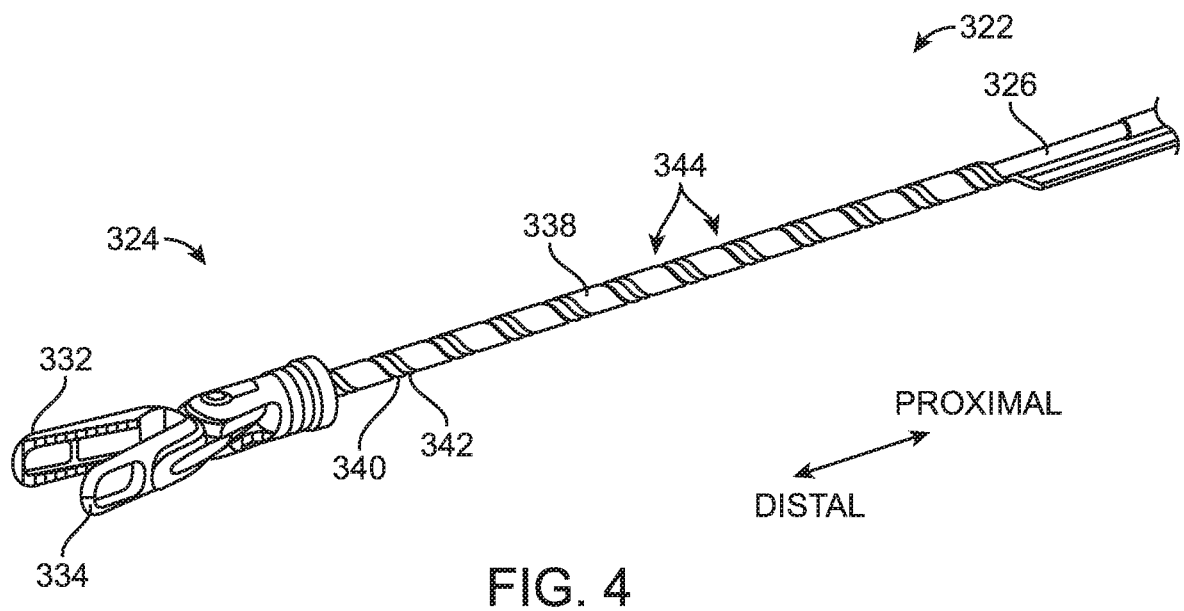
FIG. 4 is a detailed, partial perspective interior view of the instrument and end effector according to the exemplary embodiment of FIG. 3.

Referring now to FIG. 4, which shows the distal portion 324 of the instrument with the exterior instrument shaft omitted for clarity, the sleeve 338 includes a negative feature through which flux conduits, such as conductive members 340 and 342, are routed. In the exemplary embodiment of FIG. 4, the negative feature comprises a helical slot 344 formed in the sleeve 338 and extending along at least a portion of a length of the sleeve 338. The conductive members 340 and 342 are routed through the helical slot 344 of the sleeve 338. As shown in FIGS. 3 and 4, using a negative feature, such as the helical slot 344 for example, enables routing of the conductive members 340 and 342 through the bore 336 (FIG. 3) of the instrument shaft 322 and around the actuation member 326 without requiring an increase in the diameter d (FIG. 3) of the bore 336 of the instrument shaft 322 to accommodate the conductive assemblies 340 and 342.

The helical geometry of the slot 344 provides conservation of length of the conductive assemblies 340 and 342 during articulation of the wrists 328. For example, a pitch p of the helical slot 344 may be chosen so that the conductive members 340 and 342 make one complete turn (i.e., extend 360 degrees) around the actuation member 326 between a location proximal to a wrist 328 and a location distal to the wrist 328. In embodiments with multiple wrists or joint structures, the helical slot 344 may be configured so that the conductive members 340 and 342 make one complete turn (i.e., extend 360 degrees) around the actuation member 326 between proximal and distal ends of each wrist. Additionally or alternatively, the helical slot 344 may include various portions with different pitches, varying pitches, helical portions separated by linear portions, etc., or any other geometry. The sleeve 338 surrounds the actuation member 326 so as to route and supports the actuation member 326 generally along a centerline of the instrument shaft, while enabling the shaft to have an outside diameter smaller than the diameter that would be required to accommodate both the thickness of the sleeve 338 and the thickness (e.g., diameter) of the conductive assemblies 340, 342 within the radial space between the actuation member 326 and the interior of the shaft 322.

Figure 5:
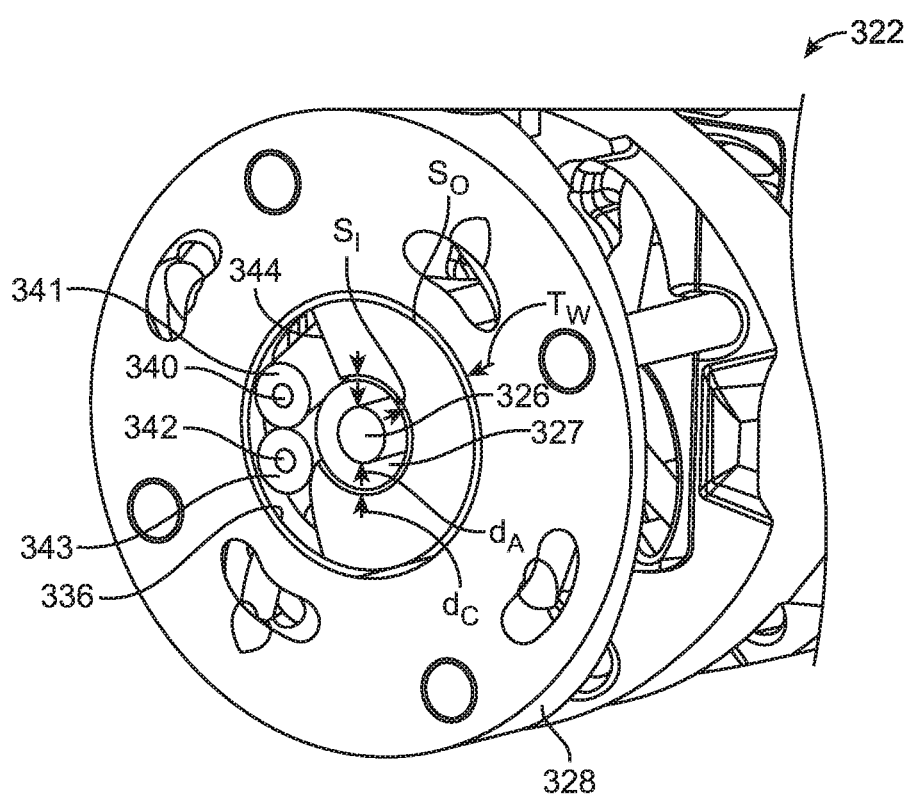
FIG. 5 is a partial, detailed cut-away view of an instrument actuation cable, a sleeve, and electrical conductors according to an exemplary embodiment.

FIG. 5 is a detailed, perspective, cut-away view of a portion of the instrument shaft 322 taken in a plane normal to the longitudinal axis of the instrument shaft 322. The actuation member 326 has a diameter $d_A$ and is surrounded by a coating 327 (e.g., a polymer coating as discussed above) with an outer diameter $d_C$. The actuation member 326 extends centrally through a bore 336 of the wrist joint 328. The conductive members 340 and 342 occupy a portion of an annular space between the inner surface of the bore 336 and the outer diameter $d_C$ of the coating of the actuation member 326. As non-limiting examples, the actuation member 326 may have a diameter $d_A$ of approximately one millimeter (1.0 mm) or less. The outer diameter $d_C$ of the coating may be less than 2.0 mm, less than 1.0 mm, greater than 2.0 mm, etc. The coating may comprise a single layer of material or multiple layers of material, and may be formed on the actuation member 326 by extrusion, by one or more layers of heat-shrinking tubing, etc. The bore 336 may have a diameter of less than about 5.0 mm, less than 4.0 mm, less than 3.0 mm, etc. In this exemplary embodiment, the actuation member 326 has a diameter $d_A$ of about 0.5 millimeters (mm) and includes an ETFE coating 327 with an outer diameter $d_C$ of about 1.0 mm. A bore 336 with a diameter of about 2.7 mm extends through the wrist joint 328. When the actuation member 326 is positioned centrally within the wrist joint 328, a space of between about 0.7 mm and 0.8 mm exists between the bore and the actuation member 326. The conductive assemblies 340 and 342 have an outer diameter of less than about 0.7 mm, for example, less than about 0.5 mm, for example, ranging from about 0.4 mm to about 0.5 mm, including, in an embodiment, the ETFE insulating jackets comprising the insulating material 343 of that embodiment. As noted earlier, materials other than ETFE, such as PTFE, may also be used.

As illustrated in FIG. 5, the helical slot 344 extends fully through the wall thickness $t_W$ of the sleeve 338. In other words, the helical slot 344 extends from an inner surface $s_I$ to an outer surface $s_O$ of the sleeve 338. This "open" configuration of the sleeve 338 may facilitate cleaning, sterilization, etc. where such processes depend on flow of a liquid or gas throughout the interior of instrument shaft 322. The conductive members 340 and 342 and the helical slot 344 may be sized such that the conductive members 340 and 342 fit with little to no clearance in the helical slot 344. Such an arrangement permits the conductive members 340 and 342 to support and lend geometric strength to the sleeve 338.

Figure 6:
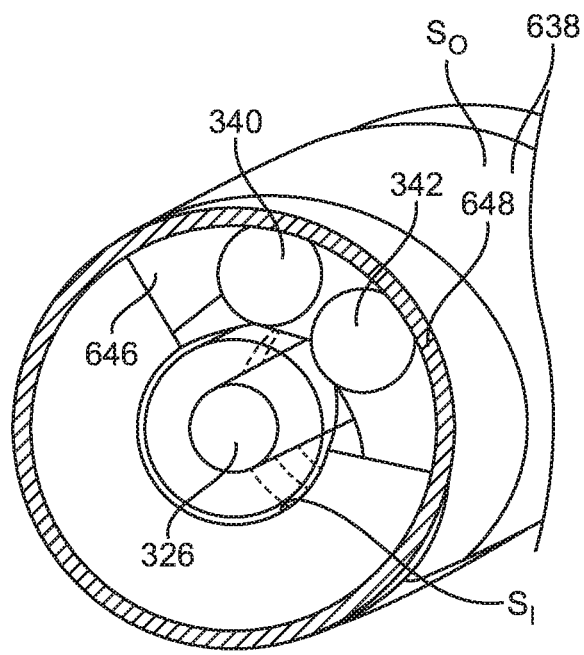
FIG. 6 is a partial, detailed cut-away view of an instrument actuation cable, a sleeve, and electrical conductors according to an exemplary embodiment.

Referring now to FIG. 6, an exemplary embodiment of an actuation member 326, conductive members 340 and 342, and a sleeve 638 is shown. In the embodiment of FIG. 6, the sleeve 638 includes a helical recess 646 that extends only partially through the sleeve 638. That is, in the exemplary embodiment of FIG. 6, the helical recess 646 is formed on the interior diameter of the sleeve 638, but unlike the helical slot 344 in FIGS. 3 and 4, the helical recess 646 extends only partially into the sleeve 638 and does not penetrate all the way through to the outer surface $s_O$ of the sleeve 638. Thus, a relatively thinner (relative to the full sleeve wall thickness $t_W$) portion 648 of the sleeve 638 is disposed between the conductive assemblies 340 and 342 and the bore 336 of the instrument shaft 322 (FIG. 3). Such a configuration may provide additional protection to the conductive assemblies 340 and 342 against abrasion, for example, during articulation of the wrist 328 or other joints of the instrument shaft 322 (FIG. 3) through which the conductive members 340, 342 are routed.

Figure 7:
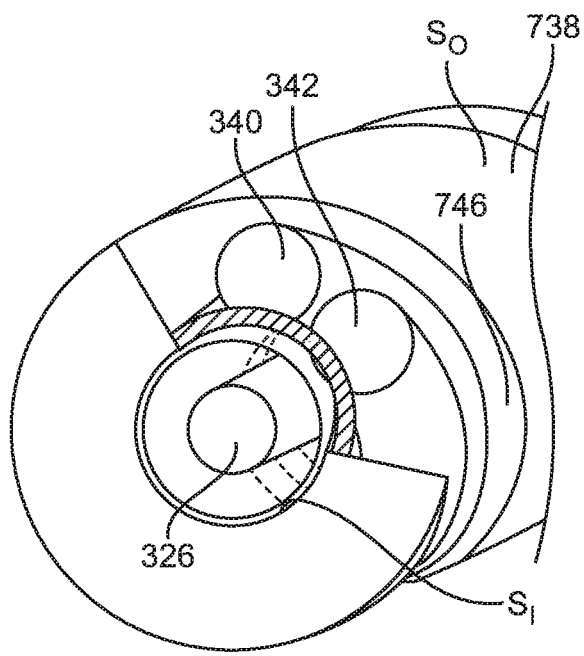
FIG. 7 is a partial, detailed cut-away view of an instrument actuation cable, a sleeve, and electrical conductors according to an exemplary embodiment.

Referring now to FIG. 7, another exemplary embodiment of the disclosure is shown. The exemplary embodiment of FIG. 7 is similar to the exemplary embodiment of FIG. 6, but a helical recess 746 is formed in the outer surface $s_O$ of a sleeve 738. In other words, the helical recess 746 extends from the outer surface $s_O$ of the sleeve 738, but does not penetrate through the entire wall thickness $t_W$ to the inner surface $s_I$ of the sleeve 738. This arrangement leaves a relatively thinner (relative to the full wall thickness $t_W$ of the sleeve between the inner and outer surfaces) portion 748 of the sleeve disposed between the conductive members 340 and 342 and the actuation member 326. Compared to embodiments in which the recess penetrates partially into the inner surface of the sleeve, such as the embodiment of FIG. 6, embodiments such as FIG. 7, where the recess penetrates partially into the outer surface of the sleeve, may ease assembly and manufacturing of the instrument, as the conductive members 340 and 342 can easily be wrapped around the outside surface of the sleeve and into the recess.

The presence of the relatively thinner portion 648 or 748 of the sleeves 638 or 738 in the exemplary embodiments shown in FIGS. 6 and 7 relative to the exemplary embodiment of FIGS. 3, 4, and 5 may provide additional stiffness and geometric strength to the sleeves 638, 738. In such embodiments, it may be desirable to include openings (e.g., holes) through the sleeve 638, 738 to facilitate cleaning of the surgical instrument, e.g., to allow cleaning fluids to circulate through the interior of the instrument shaft 322 (FIG. 3).

Figure 8:
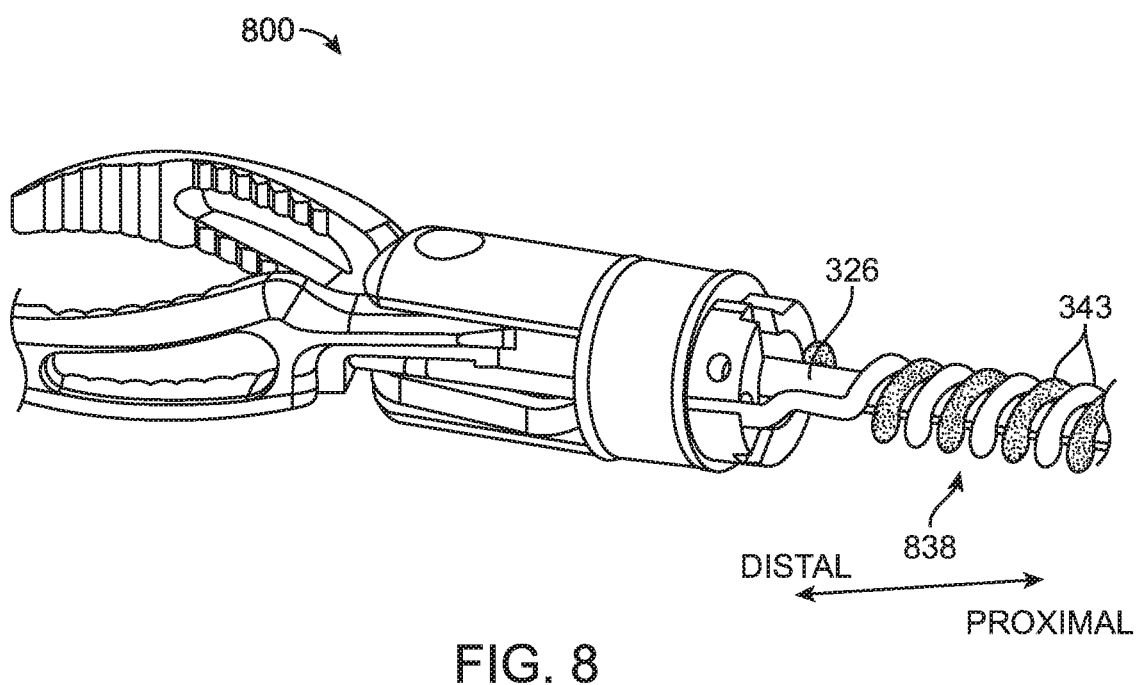
FIG. 8 is a partial perspective interior view of an internal portion of an instrument shaft, an end effector, and electrical conductors according to an exemplary embodiment.
Figure 9:
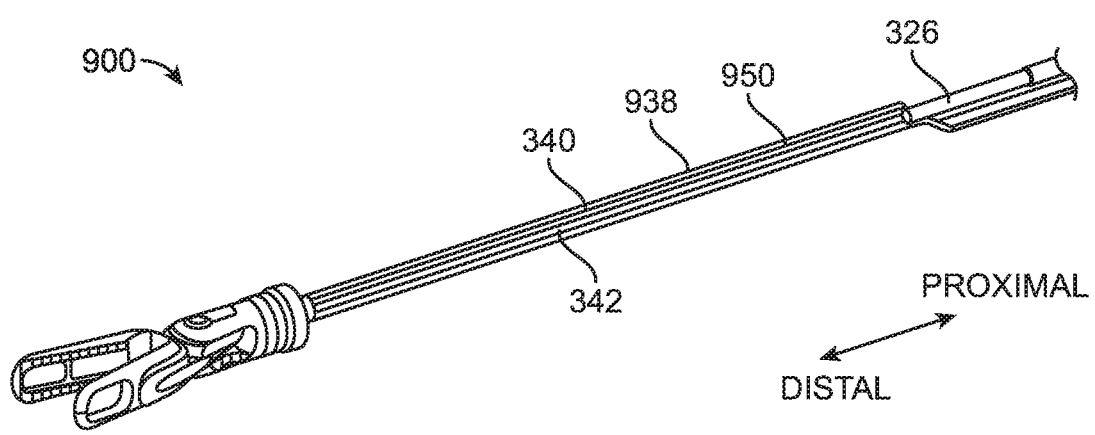
FIG. 9 is a partial perspective interior view of an internal portion of an instrument shaft, a sleeve, and electrical conductors according to an exemplary embodiment.

Referring now to FIG. 8, another exemplary embodiment of a surgical instrument 800 of the disclosure is shown. In the embodiment of FIG. 8, the conductive members 340 and 342 are helically wrapped around the actuation member 326 such that adjacent helical turns are close to or in contact with one another (i.e., there is no space between helical turns of the conductive members 340 and 342). Stated another way, the helical turns of the conductive members 340 and 342 may have a pitch equal to about twice a cross-sectional dimension (e.g., a diameter, a width, or other cross-sectional dimension) of each of the conductive members 340 and 342. The cross-sectional shape of the conductive members 340 and 342 in the embodiment of FIG. 8 or any other embodiment described herein may be circular, rectangular, square, elliptical, or other shapes or combinations of shapes. In some exemplary embodiments, a conductive member may comprise a plurality of conductive cores within and separated by a single extruded insulating jacket. In exemplary embodiments in which the surgical instrument 800 includes only a single conductive member, the helical turns may have a pitch equal to the cross-sectional dimension (e.g., the diameter) of the conductive member. With this arrangement, the insulating material 343 (FIG. 3) surrounding the conductive core of the conductive member(s) forms a sleeve 838 between the actuation member 326 and the bore (not shown) of the instrument shaft 322 (FIG. 3). The sleeve 838 comprising the insulating material 343 of the conductive members may provide the same functionality as the sleeve 338 described in connection with FIG. 3. For example, the sleeve 838 comprising the insulating material 343 of the conductive members provides a relatively low-friction surface against which the actuation member 326 translates and may protect the actuation member 326 from contact with sharp or rough edges of the wrist components within the bore of the instrument shaft 322 (FIG. 3). The sleeve 838 may similarly provide support against buckling as the actuation member 326 translates proximally and distally to operate the end effector 320. The insulating material 343 of the conductive members may comprise a polymer material such as ETFE, PTFE, or other electrically insulating materials having sufficient strength and suitable frictional characteristics, such as those described above for the sleeves in other exemplary embodiments. In the exemplary embodiment of FIG. 8, the insulating material 343 of the conductive members may be characterized as the insulating jacket or the sleeve, and the opening in the center of the insulating material 343 through which the conductors pass may be characterized as a negative feature. Accordingly, the negative feature is provided within an overall thickness of the sleeve via the passage running through the insulating material 343 that surrounds the conductive members. Referring now to FIG. 9, another exemplary embodiment of a portion of a surgical instrument 900 is shown, with the exterior instrument shaft omitted for clarity. In this embodiment, a sleeve 938 is disposed around actuation member 326. The sleeve 938 includes a recess 950 through which conductive assemblies 340 and 342 are routed. In the exemplary embodiment of FIG. 9, the recess 950 extends linearly along a length of the sleeve 938. The recess 950 may extend completely through a wall thickness of the sleeve 938, as described above in connection with FIGS. 3 and 4. Alternatively, the recess 950 may extend only partially through the wall thickness of the sleeve 938, as described above in connection with FIGS. 6 and 7. In embodiments in which the recess 950 does not extend fully through the wall thickness of the sleeve 938, the sleeve 938 may be provided with openings (e.g., holes, not shown) to enable flow of liquid and/or gas throughout the interior of the shaft of the surgical instrument to facilitate sterilization and cleaning of the surgical instrument 900.

Because the conductive assemblies 340, 342 are offset from a neutral bending axis of the instrument shaft (e.g., and also radially offset from actuation members extending through the bore of the shaft), under some circumstances the linear cable routing shown in FIG. 9 may interfere with full articulation of any wrists due to the conductive assemblies 340, 342 being placed under tension and/or compression as the wrists articulate. Stated another way, an effective length of the linear (straight) recesses 950 may increase or decrease with articulation of a wrist. Accordingly, in some exemplary embodiments, sleeves of the disclosure are configured with one or more recesses extending linearly along the length of the sleeve and are additionally configured to facilitate longitudinal movement of one or more flux conduits (e.g., conductive assemblies 340 and 342) through the longitudinal recess as one or more joint structures (e.g., wrists) of the instrument shaft articulate. For example, in some exemplary embodiments, the one or more flux conduits the one or more flux conduits may be provided with a portion of slack as they extend along the instrument shaft. The slack area of the one or more flux conduits enables the flux conduits to move longitudinally through the linear recess of one or more sleeve segments as the joint structures articulate.

For example, referring now to FIG. 11, a cross sectional view of a distal portion of an instrument 1224 is shown. The instrument 1224 includes a portion of an end effector 1220, such as an end effector including opposing jaws (only one jaw 1232 shown in FIG. 11 due to the cross-section view). A shaft 1222 of the instrument 1224 includes at least one joint structure 1228 configured to impart movement in at least one degree of freedom (e.g., pitch and/or yaw) of the end effector 1220 relative to the shaft 1222. The instrument 1224 includes within the shaft 1222 a first sleeve segment 1252 and a second sleeve segment 1254. The first sleeve segment 1252 and the second sleeve segment 1254 are longitudinally separated by a distance L. Within a space spanning the distance L between the first sleeve segment 1252 and the second sleeve segment 1254, conductive assemblies 340, 342 are loosely coiled around actuation member 1226 to form an area of slack 1256 in the conductive assemblies 340, 342. The area of slack 1256 may be positioned proximal to all joint structures 1228 of the instrument 1224, or it may be positioned along a rigid portion of the shaft 1222 between joint structures 1228. As shown in FIG. 11, the area of slack 1256 is located proximal to the at least one joint structure 1228 in a rigid portion 1223 of the shaft 1222. For example, the rigid portion 1223 of the shaft 1222 may be a portion of the shaft located between two joint structures, such as a portion of shaft 222 between the wrists 228 and 229 as shown in FIG. 2. Additionally or alternatively, one or more areas of slack may be located proximally to all of the joint structures of the instrument shaft 1222 (not shown).

In the exemplary embodiment of FIG. 11, the conductive assemblies in the area of slack 1256 are loosely coiled around the actuation member 1226 to form the area of slack 1256. In other exemplary embodiments, the conductive assemblies 340, 342 may be routed along a non-straight path other than a helical path to form the area of slack 1256. For example, the conductive assemblies could be arranged in a generally S-shaped, U-shaped, or other configuration to form the area of slack 1256.

FIG. 12 shows the instrument 1224 of FIG. 11 with the shaft 1222 omitted for clarity. The first sleeve segment 1252 and the second sleeve segment 1254 include linear recesses 1250 extending lengthwise along each of the first sleeve segment 1252 and second sleeve segment 1254. As the one or more joint structures 1228 (FIG. 11) articulate, tensile and/or compressive forces developed in the conductive assemblies 340, 342 cause the conductive assemblies 340, 342 to move within the recesses 1250, drawing length from or increasing the length of the portion of the conductive assemblies 340, 342 within the area of slack 1256. For example, if the joint structures 1228 articulate to move the end effector 1220 in yaw, e.g., along direction 1260, a portion of the conductive assemblies 340, 342 are pulled from the area of slack 1256 into the recess 1250 of the first sleeve segment 1252. If the joint structures 1228 are articulated to return the end effector 1220 to the straight position shown in FIG. 12, the additional length of the conductive assemblies 340, 342 that was pulled from the area of slack 1256 into the recess 1250 of the first sleeve segment 1252 is pushed out of the recess 1250 and back into the area of slack 1256. Similarly, other articulations of the end effector 1220 in directions 1258 (e.g., pitch) and/or 1260 (e.g., yaw) result in portions of the length of the conductive assemblies 340, 342 being pulled from area of slack 1256 into the linear recesses 1250 and/or portions of the length of the conductive assemblies 340, 342 being pushed from the linear recesses 1250 into the area of slack 1256.

The rotational (angular around the centerline) orientation of the linear recesses 1250 may be chosen based on the orientation of movement of the joint structures 1228 to reduce the necessary movement of the conductors through the linear recess 1250. For example, referring still to FIG. 12, if motion of the joint structures 1228 is primarily in direction 1258 (e.g., pitch), then the linear recess 1250 and conductive assemblies 340, 342 may be routed such that they lie in a plane oriented normal to the direction 1258, the plane passing through a center of the shaft 1222. Thus, when the joint structures 1228 move the end effector 1220 in direction 1258 (e.g., in pitch), the conductive assemblies 340, 342 remain aligned with a neutral axis of the shaft, and the conductive assemblies 340, 342 are not required to move significantly to compensate for movement of the joint structures 1228. Similarly, if the majority of movement of the joint structures 1228 is in direction 1260 (e.g., yaw), routing of the conductive assemblies 340, 342 may be rotated 90 degrees, e.g., in the orientation in which the second sleeve segment 1254 is shown in FIG. 12. In embodiments in which movement of the end effector 1220 is expected to be significant both in pitch and in yaw, the orientation of the linear recesses 1250 may be based on, e.g., ease of assembly or other factors.

Because the area of slack 1256 does not coincide with the joint structures 1228 along the length of the shaft 1222, the first sleeve segment 1252 fully supports the actuation member 1226 and centers the actuation member 1226 within the joint structures 1228. The location of the area of slack 1256 may be chosen to correspond with a portion of the shaft 1222 that does not include any joint structures 1228, so that the sleeve segments (e.g., first and second sleeve segments 1252 and 1254) are present to support and prevent buckling of the actuation member 1226 through any joint structures 1228. In some exemplary embodiments, the instrument 1224 may include a plurality of slack areas 1256 positioned between multiple sleeve segments.

In the exemplary embodiment of FIG. 12, a rigid spacer 1257 surrounds the actuation member 1226 between the first sleeve segment 1252 and the second sleeve segment 1254. The rigid spacer 1257 maintains the longitudinal distance L between the first sleeve segment 1252 and the second sleeve segment 1254 and prevents the actuation member 1226 from buckling along the distance L. The rigid spacer 1257 has a radial wall thickness small enough to enable routing of the conductive members 340, 342 along the length L between an exterior surface of the rigid spacer 1257 and an interior surface of the rigid portion 1223 of the shaft 1222. Additionally or alternatively, the actuation member 1226 may include a rigid portion corresponding to the location of the slack area(s) 1256 to mitigate (e.g., eliminate) the need for lateral support of the actuation member 1226 by the rigid spacer 1257 in that location.

The first and second sleeve segments 1252 and 1254 may be formed by extrusion, with no additional cutting or machining step being necessary to form the recesses 1250. The first and second sleeve segments 1252 and 1254 may be formed from a material having a relatively low coefficient of friction to facilitate movement of the conductive members 340, 342 through the recesses 1250. For example, in an exemplary embodiment, the first and second sleeve segments 1252 and 1254 may be formed from polytetrafluoroethylene (PTFE), ethylene tetrafluoroethylene (ETFE), or any of the materials discussed above in connection with other exemplary embodiments of the disclosure.

Figure 13:
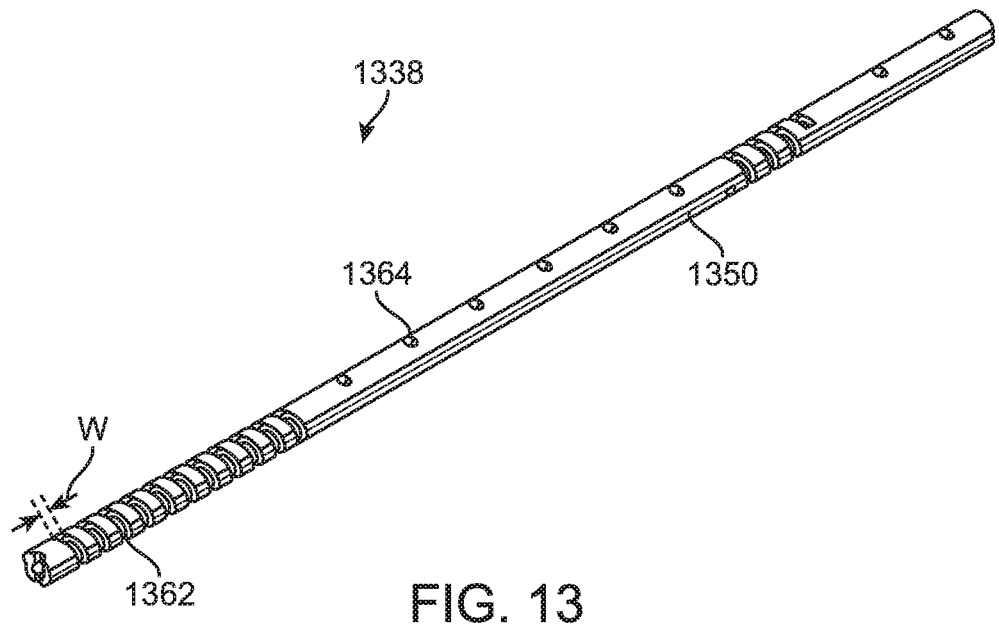
FIG. 13 is a perspective view of a sleeve according to another exemplary embodiment.

In some exemplary embodiments, sleeves of the disclosure may include helical slots, slits, and/or cuts configured and positioned at locations along a length of the sleeve to reduce the bending stiffness of the sleeve proximate the joint structures, e.g., wrists 328 (FIG. 4) and 1228 (FIG. 11). For example, referring now to FIG. 13, an embodiment of a sleeve 1338 is shown. The sleeve 1338 includes helical reliefs 1362 extending over portions of the sleeve 1338 that are positioned proximate joint structures (e.g., wrists 328) when the sleeve 1338 is assembled in an instrument. In the embodiment of FIG. 13, conductive assemblies 340, 342 (FIG. 4) are not routed through the helical reliefs 1362; rather, the conductive assemblies 340, 342 are routed through linear (straight) recesses 1350, and the sleeve 1338 may be incorporated with an instrument having a slack area as discussed above in connection with FIGS. 11 and 12 to allow movement of the conductive assemblies 340, 342 through the linear recesses 1350 as any joint structures of the instrument articulate. However, any of the sleeves described herein, such as sleeves 338 (FIG. 4), 638 (FIG. 6), 738 (FIG. 7), 938 (FIG. 9), and 1252 and 1254 (FIGS. 11 and 12) may include such reliefs for reducing the bending stiffness of the sleeve.

The helical reliefs 1362 may be formed in the sleeve 1338 by, for example, a cutting process, while the linear recesses 1350 may be formed by, for example, extrusion. The helical reliefs 1362 may reduce the bending stiffness of the sleeve 1338 to facilitate articulation of the joint structures. The helical reliefs may have a width w of, for example, between about 0.01 inches (0.254 mm) and about 0.05 inches (1.27 mm). The sleeve 1338 includes openings (e.g., holes 1364) to facilitate cleaning by allowing cleaning fluids to flow between the exterior of the sleeve 1338 and the interior of the sleeve 1338. The helical reliefs 1362 may extend partially or fully through a wall thickness of the sleeve 1338. While the embodiment of FIG. 13 is shown with helical reliefs 1362, the reliefs 1362 need not necessarily be helical. For example, sleeve 1338 could include reliefs that extend around at least a portion of a circumference of the sleeve 1338, may be oriented lengthwise along the sleeve 1338, or may have any other geometry or configuration that reduces the bending stiffness of the sleeve 1338.

Figure 14:
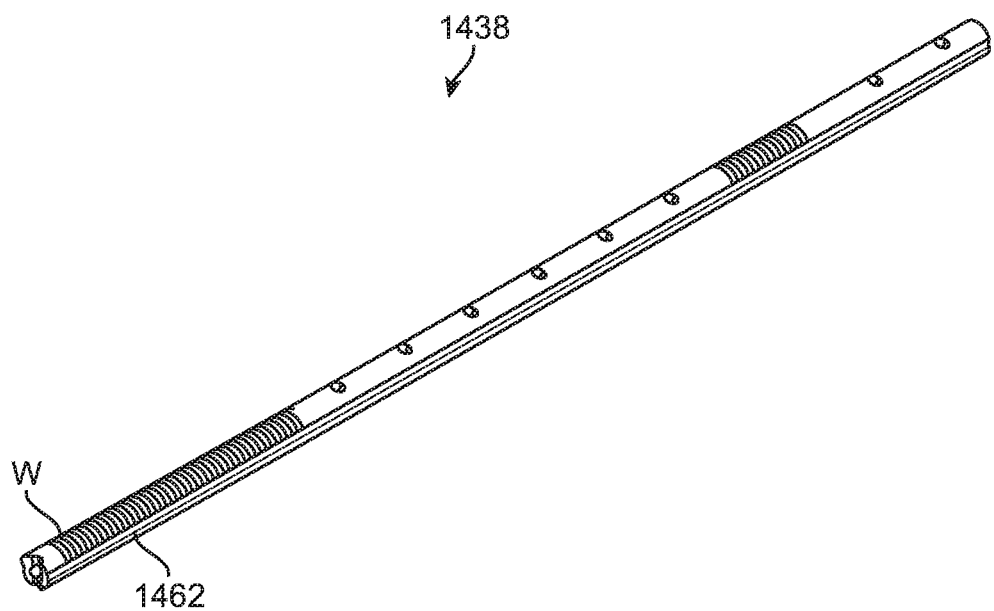
FIG. 14 is a perspective view of a sleeve according to yet another exemplary embodiment.

Referring now to FIG. 14, another embodiment of a sleeve 1438 according to the disclosure is shown. Sleeve 1438 may be similar in most respects to the sleeve 1338, but the helical reliefs 1462 exhibit a width w less than a width of the helical reliefs 1362 of the sleeve 1338 shown in FIG. 13. For example, the helical reliefs 1462 may have a width w of less than 0.01 inches (0.254 mm), and the width w may be substantially equal to a cutting width (i.e., kerf) of a cutting tool used to form the helical reliefs. In some exemplary embodiments, the helical reliefs 1462 may have a substantially zero width w, and may be formed by a cutting tool with a small or negligible kerf, such as a razor, knife, etc. The helical reliefs 1462 may extend partially or fully through a wall thickness of the sleeve 1438. As noted above in connection with FIG. 13, the reliefs need not necessarily be helical, and any shape and/or configuration that contributes to reducing the bending stiffness of the sleeve 1438 is contemplated within the disclosure.

Figure 15:
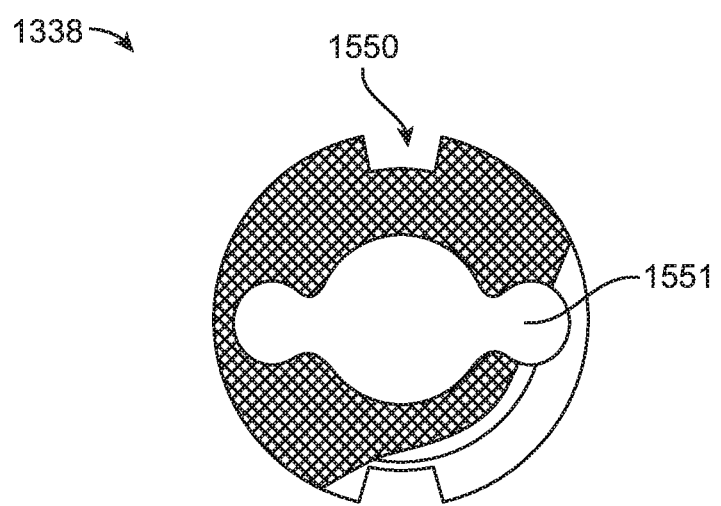
FIG. 15 is a cross-sectional view of a sleeve according to yet another exemplary embodiment.

Referring now to FIG. 15, a cross-sectional view of a sleeve 1538 is shown. The sleeve 1538 includes external linear recesses 1550 and internal linear recesses 1551 through which flux conduits (e.g., conductive assemblies 340 and 342) are routed. While two external recesses 1550 and two internal recesses 1551 are shown in FIG. 15, some embodiments may include only internal recesses, only external recesses, a single internal recess and/or a single external recess, etc. In some exemplary embodiments, the sleeve 1538 includes helical reliefs, such as helical reliefs 1362 and 1462 discussed above in connection with FIGS. 13 and 14. In some exemplary embodiments, the helical reliefs 1362, 1462 may extend partially through the wall thickness of sleeve 1538 and intersect the internal recesses 1551. Such a configuration provides a fluid path between the interior of the sleeve 1538 and the exterior of the sleeve 1538 through the helical reliefs 1362 and/or 1462. The sleeve 1338 may be made of any of the materials identified above in connection with other sleeve embodiments and may be formed by, for example, extrusion, injection molding, and other processes.

In various exemplary embodiments described and shown herein, the flux conduits comprise electrical conductors. However, the present disclosure is not intended to be limiting and contemplates other flux conduits, such as tubing for transmitting light, gasses, liquids, vacuum, and other types of fluxes. Moreover, while the various exemplary embodiments described and shown herein include two electrically conductive members, the present disclosure contemplates other numbers of flux conduits, such as one conduit, or more than two conduits, routed through a sleeve.

This description and the accompanying drawings that illustrate exemplary embodiments should not be taken as limiting. Various mechanical, compositional, structural, electrical, and operational changes may be made without departing from the scope of this description and the invention as claimed, including equivalents. In some instances, well-known structures and techniques have not been shown or described in detail so as not to obscure the disclosure. Like numbers in two or more figures represent the same or similar elements. Furthermore, elements and their associated features that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

For the purposes of this specification and appended claims, unless otherwise indicated, all numbers expressing quantities, percentages, or proportions, and other numerical values used in the specification and claims, are to be understood as being modified in all instances by the term "about," to the extent they are not already so modified. Accordingly, unless indicated to the contrary, the numerical parameters set forth in the following specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," and any singular use of any word, include plural referents unless expressly and unequivocally limited to one referent. As used herein, the term "include" and its grammatical variants are intended to be non-limiting, such that recitation of items in a list is not to the exclusion of other like items that can be substituted or added to the listed items.

Further, this description's terminology is not intended to limit the invention. For example, spatially relative terms—such as "beneath", "below", "lower", "above", "upper", "proximal", "distal", and the like—may be used to describe one element's or feature's relationship to another element or feature as illustrated in the figures. These spatially relative terms are intended to encompass different positions (i.e., locations) and orientations (i.e., rotational placements) of a device in use or operation in addition to the position and orientation shown in the figures. For example, if a device in the figures is turned over, elements described as "below" or "beneath" other elements or features would then be "above" or "over" the other elements or features. Thus, the exemplary term "below" can encompass both positions and orientations of above and below. A device may be otherwise oriented (rotated 90 degrees or at other orientations) and the spatially relative descriptors used herein interpreted accordingly.

Further modifications and alternative embodiments will be apparent to those of ordinary skill in the art in view of the disclosure herein. For example, the systems and the methods may include additional components or steps that were omitted from the diagrams and description for clarity of operation. Accordingly, this description is to be construed as illustrative only and is for the purpose of teaching those skilled in the art the general manner of carrying out the present teachings. It is to be understood that the various embodiments shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the spirit and scope of the present teachings and following claims.

It is to be understood that the particular examples and embodiments set forth herein are non-limiting, and modifications to structure, dimensions, materials, and methodologies may be made without departing from the scope of the present teachings.

Other embodiments in accordance with the present disclosure will be apparent to those skilled in the art from consideration of the specification and practice of the invention disclosed herein. It is intended that the specification and examples be considered as exemplary only, with the following claims being entitled to their fullest breadth, including equivalents, under the applicable law.

What is claimed is:

1. A surgical instrument, comprising:
    a shaft having a proximal end, a distal end, and a bore extending from the proximal end to the distal end;
    an end effector coupled to the distal end of the shaft;
    an actuation member extending through the bore of the shaft and operably coupled to the end effector;
    a sleeve within the bore of the shaft and comprising a lateral wall having an inner surface disposed around the actuation member, an outer surface, and a wall thickness measured from the inner surface to the outer surface, wherein the sleeve comprises a first negative feature in the lateral wall of the sleeve and a second negative feature in the lateral wall of the sleeve, the first negative feature extending through the inner surface of the lateral wall and at least partially through the wall thickness, and the second negative feature extending through the outer surface of the lateral wall and at least partially through the wall thickness, each of the first and second negative features extending along at least a portion of a length of the sleeve; and
    a flux conduit configured to transmit a surgical flux to the end effector, the flux conduit extending from the proximal end of the shaft to the end effector, the flux conduit being at least partially received within the first negative feature of the sleeve.

2. The surgical instrument of claim 1, wherein the first negative feature extends completely through the wall thickness of the lateral wall of the sleeve and the second negative feature extends partially through the wall thickness of the lateral wall.

3. The surgical instrument of claim 1, wherein the second negative feature extends completely through the wall thickness of the lateral wall of the sleeve and the first negative feature extends partially through the wall thickness of the lateral wall.

4. The surgical instrument of claim 1, wherein the flux conduit comprises an electrical conductor.

5. The surgical instrument of claim 4, wherein the flux conduit further comprises an insulating material around the electrical conductor.

6. The surgical instrument of claim 1, wherein the end effector is an electrosurgical end effector, and the flux conduit transmits electrosurgical energy to the end effector.

7. The surgical instrument of claim 1, wherein the actuation member is centrally routed through the bore of the shaft.

8. The surgical instrument of claim 1, further comprising a joint structure coupling the end effector to the distal end of the shaft, and at least another actuation member configured to articulate the joint structure.

9. The surgical instrument of claim 1, wherein the flux conduit comprises an electrically conductive core surrounded by electrically insulating material.

10. The surgical instrument of claim 1, wherein the flux conduit is operably connected with a portion of the end effector.

11. The surgical instrument of claim 1, wherein the shaft comprises one or more joint structures located between the end effector and the proximal end of the shaft.

12. The surgical instrument of claim 1, wherein the sleeve comprises a first sleeve segment longitudinally separated by a distance from a second sleeve segment and wherein, within a space spanning the distance between the first and second segments, a portion of the flux conduit has slack and is moveable relative to the first negative feature.

13. A surgical instrument, comprising:
a shaft having a proximal end, a distal end, and a bore extending from the proximal end to the distal end;
an end effector coupled to the distal end of the shaft;
an actuation member extending through the bore of the shaft and operably coupled to the end effector;
a sleeve within the bore of the shaft and comprising a lateral wall having an inner surface disposed around the actuation member, wherein the sleeve comprises a negative feature in the lateral wall of the sleeve, wherein the negative feature extends along at least a portion of a length of the sleeve and the negative feature has a helical geometry along at least portion of a length of the negative feature; and
a flux conduit configured to transmit a surgical flux to the end effector, the flux conduit extending from the proximal end of the shaft to the end effector, the flux conduit being at least partially received within the negative feature of the sleeve.

14. The surgical instrument of claim 13, further comprising:
a wrist coupling the end effector to the shaft, wherein the negative feature extends at least 360 degrees over a length of the wrist.

15. The surgical instrument of claim 13, wherein the end effector is an electrosurgical end effector, and the flux conduit is configured to transmit electrosurgical energy to the end effector.

16. A method of making a surgical instrument, comprising:
routing an actuation member through a central bore of an instrument shaft and operably coupling the actuation member to an end effector at a distal end;
positioning within the bore a sleeve, the sleeve comprising a lateral wall having an inner surface, an outer surface, and a wall thickness measured from the inner surface to the outer surface, the sleeve positioned within the bore so as to at least partially surround the actuation member with the inner surface of the lateral wall of the sleeve, the sleeve further comprising a first negative feature formed through the inner surface and at least partially through the wall thickness of the lateral wall of the sleeve and a second negative feature formed through the outer surface and at least partially through the wall thickness of the lateral wall of the sleeve;
operably coupling a flux conduit to the end effector so as to enable the flux conduit to transmit a surgical flux to the end effector; and
routing the flux conduit through the bore of the instrument shaft to the end effector by fitting at least part of a length of the flux conduit at least partially within the first negative feature formed in the lateral wall of the sleeve.

17. The method of claim 16, wherein at least a portion of a length of each of the first negative feature and the second negative feature in the lateral wall of the sleeve extends along a helical path.

18. The method of claim 16, wherein the end effector is an electrosurgical end effector, and the flux conduit is configured to transmit electrosurgical energy to the end effector.

19. The method of claim 16, wherein the routing comprises forming a slack portion in the flux conduit, the slack portion moveable relative to the first negative feature.

* * * * *